United States Patent [19]
Spengler

[11] Patent Number: 5,688,297
[45] Date of Patent: Nov. 18, 1997

[54] PORTABLE CLEAN AIR FACILITY

[76] Inventor: Charles W. Spengler, 3024 W. Prospect Rd., Fort Collins, Colo. 80526

[21] Appl. No.: 656,509
[22] Filed: May 31, 1996
[51] Int. Cl.⁶ .................................................. B01D 46/10
[52] U.S. Cl. ................................................ 55/356; 55/472
[58] Field of Search .......................... 55/223, 356, 410, 55/470, 472, 473, DIG. 18, DIG. 29

[56] References Cited

U.S. PATENT DOCUMENTS

| 4,732,592 | 3/1988 | Spengler | 55/356 |
| 4,749,390 | 6/1988 | Burnett et al. | 55/410 |
| 4,804,392 | 2/1989 | Spengler | 55/356 |

Primary Examiner—Jay H. Woo
Assistant Examiner—Minh-Chau T. Pham
Attorney, Agent, or Firm—Edwin E. Greigg; Ronald E. Greigg

[57] ABSTRACT

A clean air facility including a structure made of horizontal and vertical pipes secured together at their ends. The pipe structure includes horizontal pipes upon which blowers are secured. A clean pan is secured above the blowers and includes holes in a bottom of the pan through which air is drawn to the inlet of the blower. A cover on the pan includes slots along one edge through which air is drawn by the blowers. The outlet of the blowers are connected by ducts to an air feed covering secured to a HEPA filter through which air is blown by the blowers. The clean air facility is enclosed by vinyl panels on the sides, back, top and front. Each of the blowers, the pan, the side panels and the front panel are secured in place by VELCRO® fastener connections.

5 Claims, 5 Drawing Sheets

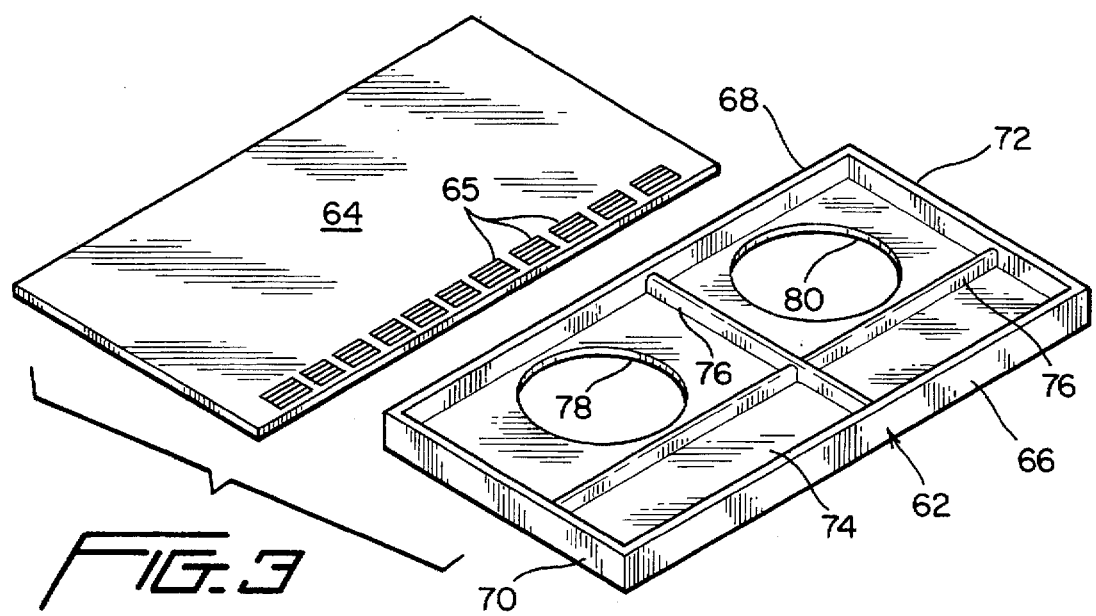
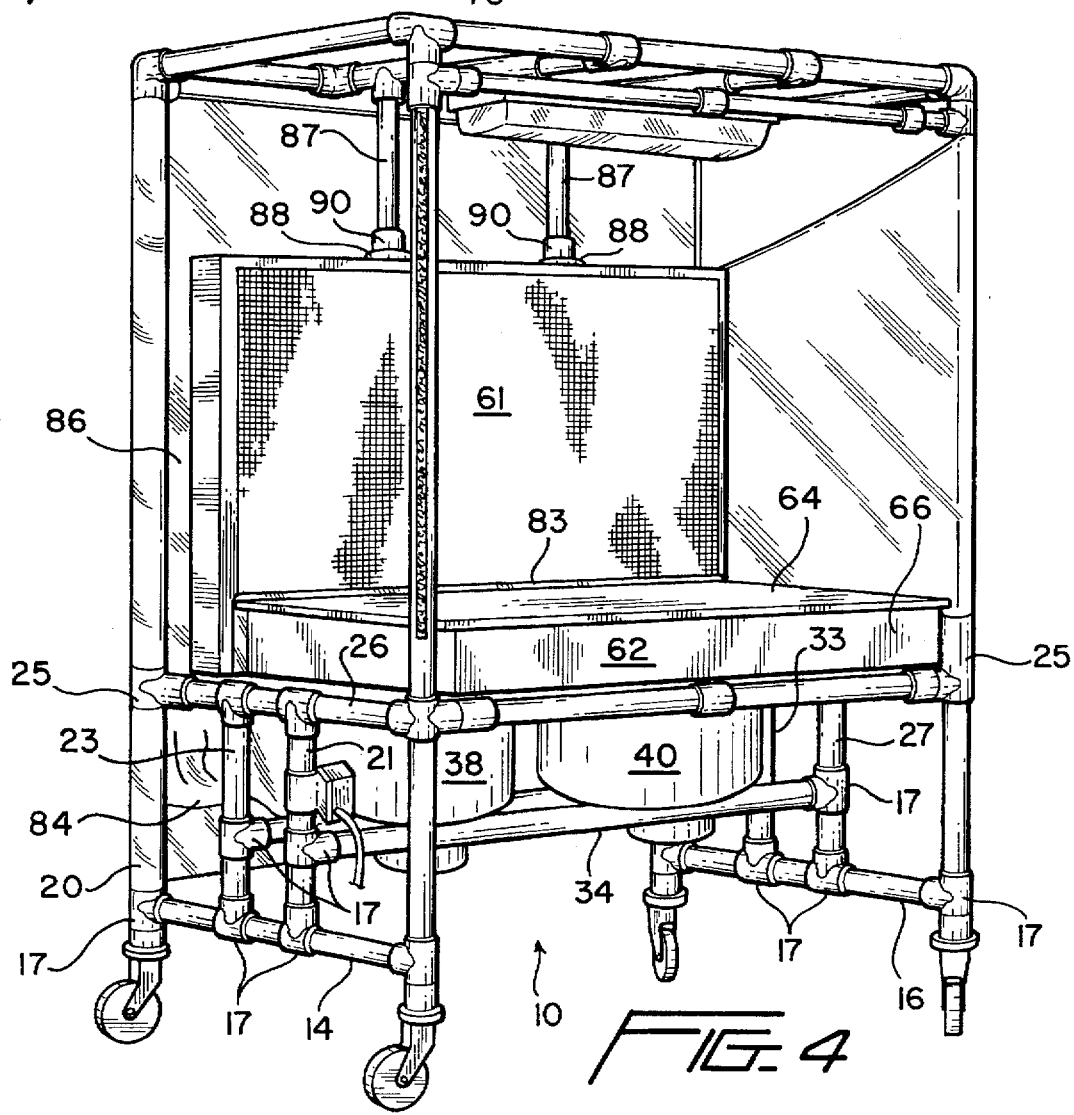

PORTABLE CLEAN AIR FACILITY

BACKGROUND OF THE INVENTION

This invention is directed to a portable clean air facility which may be used when working with and changing small animals in a clean environment. Such facilities are typically called "changing stations".

Laminar flow clean bench facilities can be found in research and manufacturing facilities, including laboratories, clinics, and pharmacies for applications such as intravenous admixtures, media preparation, particle-free electronic component assembly and non-cytotoxic pharmaceutical manipulations.

It is well known in the prior art that the primary function of a laminar flow clean work bench is to protect products from contamination during laboratory procedures by ensuring that the products are exposed to exceptionally clean filtered air. Clean work benches are not capable of aerosol containment and are not suited for the handling of toxic, infectious or sensitizing materials.

Heretofore, clean air work benches have been made in which the work bench was very heavy, was not easily movable, was made of metal enclosure parts and required mechanical features for assembly of the work bench.

Such clean air work benches must be made for easy cleaning, easy access, little maintenance, comfort of the worker and have easy mobility of the work bench. To those ends this invention has been created.

OBJECT AND SUMMARY OF THE INVENTION

It is therefore an object of this invention to provide a clean air work bench which is lightweight, portable and easily assembled.

Another object is to provide a clean air work bench which requires very few tools to assemble the device.

Still another object is to provide a clean air work bench which except for the frame is completely assembled by use of hook and loop fastener tapes, such as those bearing the trademark VELCRO® which secures the parts together.

Yet another object is to provide a clean air work bench in which the front, back sides and top of plenum are formed of vinyl connected by VELCRO.

Still another object is to provide a clean air work bench which provides a simple and easy method of disassembling and cleaning the parts of the system.

The invention will be better understood and further objects and advantages thereof will become more apparent from the ensuing detailed description when taken in conjunction with the drawings.

BRIEF DESCRIPTION OF THE DRAWINGS

FIG. 3 illustrates a perspective view of a pan and cover held in an upright position;

FIG. 4 illustrates a clean air work bench partially enclosed by back side members.

DETAILED DESCRIPTION OF THE FACILITY

Figure 1:
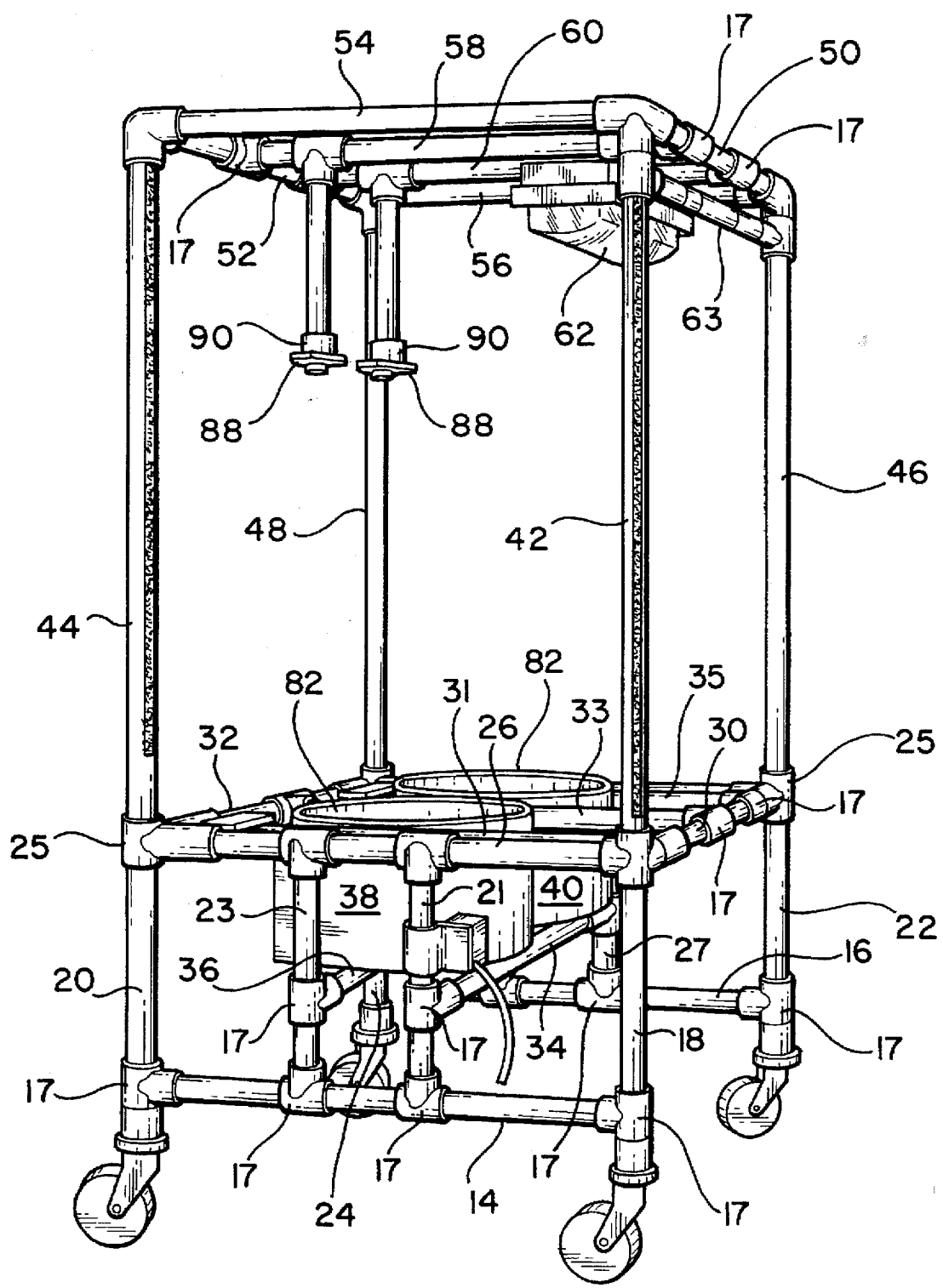
FIG. 1 is a perspective view of a supporting frame with two spaced blowers shown.

Now referring to the drawings wherein the same reference characters represent the same or like parts there is shown in the drawings a clean air work bench including a supporting structure made of interconnected vertical and horizontal pipe of any desired type such as plastic or aluminum. The frame is made with piping of different lengths by which different sections of the frame are formed. As shown in FIG. 1 the frame has opposite side sections 10, 12 which are identical in structure. Each section is formed with a lower horizontal pipe 14, 16 and vertical pipes 18, 20, 22, 24 which are held together at their lower ends to the horizontal pipes 14, 16 by use of a non-threaded tee coupling 17. The pipes 18, 20, 22 and 24 are connected together by a non-threaded double tee coupling 25 which slips over the pipes 18, 20, 22 and 24 to which are connected the ends of horizontal piping 26, 28 30 and 32, each of which are perpendicular to the vertical piping. The double tee couplings are secured onto the vertical piping 18, 20, 22, 24 so that they form a support for the horizontal pipes 26, 28 30 and 32 at a particular height for a worker as will be described later. Each of the side sections include two spaced vertical pipes 21, 23, 27, 29 between the vertical pipes, 18, 20, 22, 24. These pipes 21, 23, 27, 29 are supported at their lower ends by tee couplings 17 which slide over the pipes 14, 16 and at their upper ends by tee couplings 17 that slide over the horizontal pipe 26, 30. The vertical pipes 21, 23, 27, 29 are adjustable along the horizontal pipes to a desired spacing. These vertical pipes 21, 23, 27, 29 support horizontal pipes 34, 36 between the horizontal pipes 14, 26 and 16, 28 by use of further tee couplings 17. These horizontal pipes 34, 36 support two blowers 38, 40 which are positioned on the horizontal pipes at about ¼ the distance from the ends of the horizontal pipes 34, 36 and about half the distance along horizontal pipes 14, 16.

The bottom portion is provided with three horizontal pipes 31, 33, 35 that extend from the front horizontal pipe 30 to the rear horizontal pipe 32. Pipes 31 and 35 are near the ends of pipes 30 and 32, and the pipe 33 is at the midsection. These pipes 31, 33, 35, are connected by couplings 17 and support a work pan and lid shown in FIG. 3. The vertical and horizontal pipes are provided with VELCRO® hook fastener strips along their lengths where necessary to which an element having matching VELCRO® loop fasteners are secured.

Each of the side sections 10, 12, have an upper section formed by vertical corner pipes 42, 44, 46, 48, which are extensions of vertical pipes 18, 20, 22, 24 to which the double tee coupling 25 are secured.

The upper ends of the vertical pipes 42, 44, 46, 48 are provided with non-threaded corner couplings which connect horizontal pipes 50, 52, 54, 56 to the ends of the vertical pipes 42, 44, 46, 48. The horizontal pipes 50, 52 support further horizontal pipes 58, 60 which are perpendicular thereto and parallel with horizontal pipes 54, 56. The horizontal pipes 58, 60 are connected at their ends by tee couplings 17 and are spaced from each other for supporting a light means 62 and two short vertical pipes which are connected thereto near one end by a tee coupling 17 and will be explained later. A front side of the piping structure is provided with a horizontal pipe 63 near an upper end of the vertical pipes 42, 46 by use of tee couplings 17.

Figure 2:
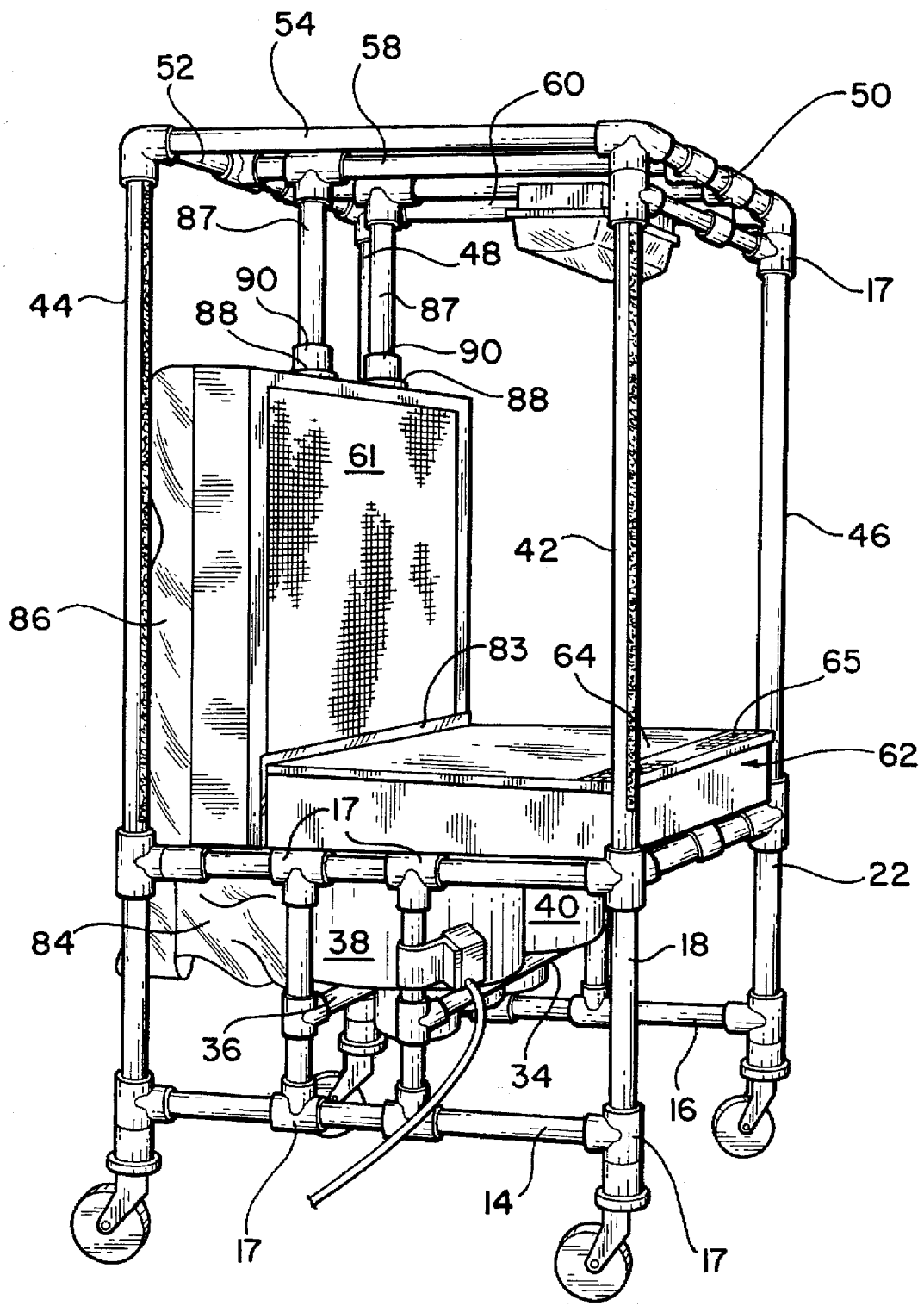
FIG. 2 illustrates the supporting frame and blowers further including a HEPA filter connected to the blowers and a work pan and cover.

FIG. 2 illustrates the structure set forth in FIG. 1 to which has been added an HEPA filter 61 and a pan 62 which has a lid 64 which is shown in FIG. 3. The pan is provided with slots 65 along its upper, front edge. The pan has sides 66, 68, ends 70, 72, a bottom 74, and a supporting cross piece 76. The bottom is provided with spaced apertures 78, 80 which fit over the blowers 38, 40, respectively. The supporting pipes 34, 36 are provided with VELCRO® loop strips to which VELCRO® hook strips on the bottom of the blowers secure the blowers 38, 40 in place below the spaced apertures 78, 80. The upper ends of the blowers are provided with VELCRO® strips to which a hard foam ring 82 is secured by use of matching VELCRO® strips. The hard foam ring seats between the blower and the bottom of the pan 62. As shown, the HEPA filter is provided with a protective strip 83 along its bottom to protect the HEPA filter from the pan. Further, the outlets of the blowers are provided with appropriate plastic sheet ducts 84, 85 which direct the air behind the HEPA filter by use of the plastic closure 86 which is secured to the outer surfaces of the HEPA filter. The plastic ducts and closure are secured in place by use of VELCRO® fasteners.

The HEPA filter is supported at the top by use of the short vertical pipes 87 which are provided with flat plates 88 on the lower end. The flat plates 88 are made with cylindrical connectors 90 which fit over the vertical pipes. The flat plates are provided with central holes in alignment with the cylindrical connectors so that the flat plates can be slid up and over the pipes for the purpose of assembly for the HEPA filter onto the frame. The bottom of the flat plates are provided with VELCRO® hooks which mate with VELCRO® loops on the upper surface of the HEPA filter. The flat plate connectors are slidable on the pipes in order to adjust the flat plates against the upper end of the HEPA filter.

FIG. 4 illustrates the frame structure partially enclosed by use of vinyl pieces of proper size which are secured to the pipes by use of VELCRO® fasteners. VELCRO® is shown on the exposed pipes of the supporting structure to which other vinyl pieces are secured.

Figure 5:
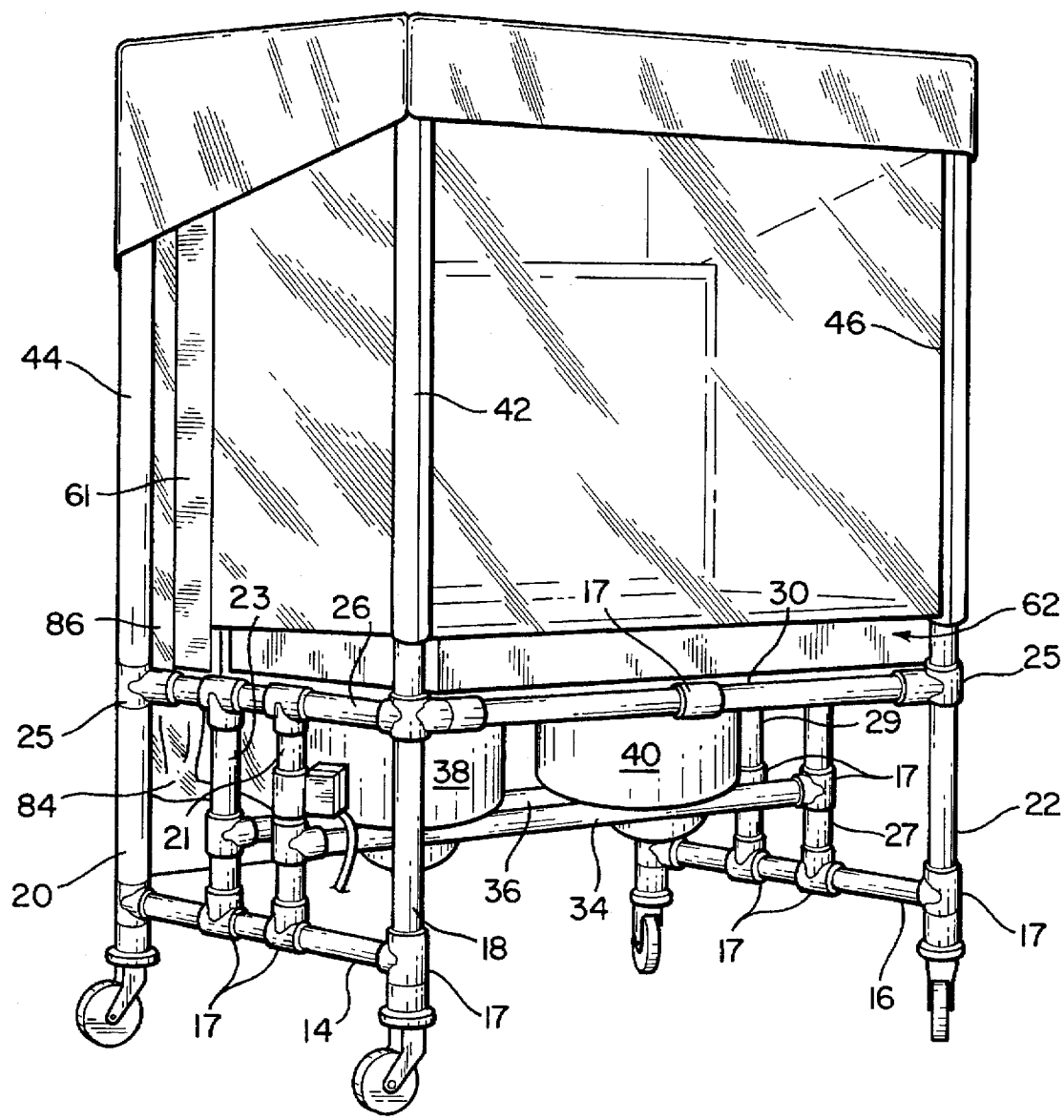
FIG. 5 illustrates a finished clean air work bench looking toward the HEPA filter in the back of the facility.
Figure 6:
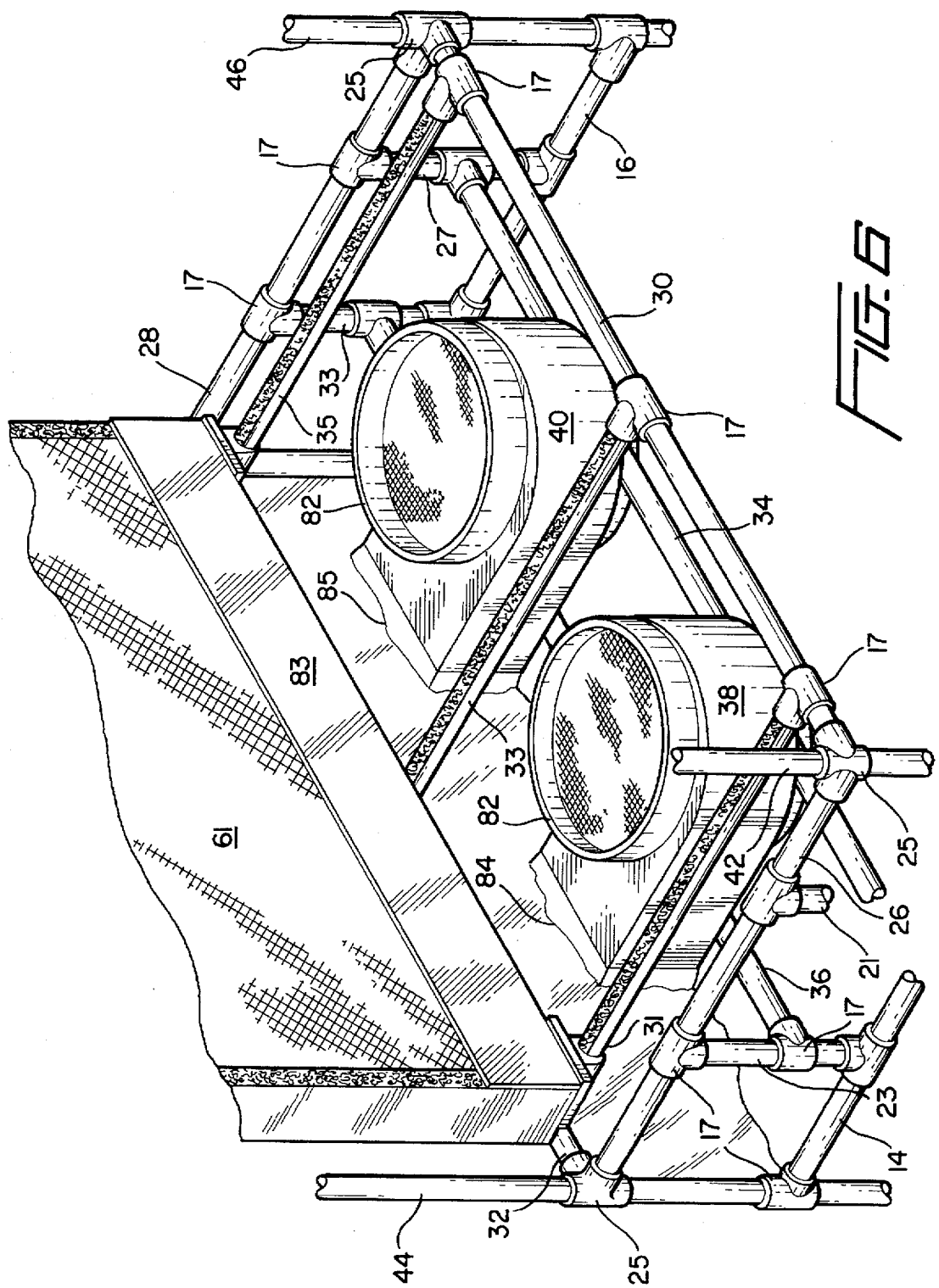
FIG. 6 is a somewhat perspective view as viewed from the front which illustrates a bottom frame section including blowers and supports for various ports.

FIG. 5 illustrates a finished clean air work facility which is shown with vinyl sides, back, top and front. The front panel is of clear plastic and encloses the work area while allowing its contents to remain visible. A suitable work area has been provided with a structure 36 inches deep, 54.5 inches long and 72 inches high; this provides a work surface of 48 inches in length and 22 inches in depth. Obviously, a structure of any size could be formed.

The pipes are held together by complemental fittings and are held in place by suitable threaded bolts which are tightened against the pipe. Such fittings permit assembly and adjustment of the parts so that they are properly fitted to each other before the bolts are tightened against the pipes.

In order to provide a quietly operated clean air work facility, the VELCRO® strips can be secured over soft foam strips which protect against vibration. Such foam strips should be used in assembly of the blowers and the pan. The assembly is provided with a lighting element in the top which is secured to the horizontal pipes. The electrical wiring for the light is secured to the piping and led to a switch box on the area below the pan. Further, a separate switch for operation of the light and blowers is also provided.

In operation, the supporting pipes are assembled, VELCRO® is placed in the proper places on the frame, the blowers, the pan, the vinyl components, etc., and the work area is assembled; once the area is assembled, the light can be turned on and the blowers started. The blowers have an inlet of the air through the holes in the pan and the air is blown out through the vinyl connectors to an area behind the HEPA filter. The air is filtered through the HEPA filter and is blown out perpendicular to the front of the HEPA filter. The air is blown toward the front enclosure and directed downwardly by the pull of the blowers which pull the air through the slots in the cover of the pan. For cleaning the pan and the air blower inlet filters, the cover and pan can be easily removed and replaced because of the VELCRO® connection. The only elements not assembled with VELCRO® are the pipe couplings and the lighting; all other parts are assembled and held in place by VELCRO® fasteners.

A VELCRO® connection is a connection in which one piece includes loops and a second piece includes hooks such that when they are pressed together they connect together by adhering to each other.

In assembly of the blowers, the blowers are positioned on the horizontal pipes, the hard foam spacer is positioned on the blowers and the pan is positioned in place. Once the pan is positioned in place the horizontal pipes 34, 36 are moved upwardly until the hard foam spacer seats on the bottom of the pan, then the horizontal pipes are secured in place with the blowers in an air tight connection with the bottom of the pan. All other parts are also connected in an air tight connection.

This structure provides parts which are easily removed for cleaning, etc., if necessary. The pan is easily removed for cleaning the pan and the pre-filter. The use of VELCRO® fasteners permits an easy quick way of assembly and disassembly which can be done with inexperienced as well as experienced personnel. In this facility the air would be recirculated by the blowers.

The clean air facility could be made without the pan but with a cover without slots. In this modification the blowers would be lowered from the cover so that air would be drawn into the blowers below the cover. The front panel would be removed, then the air would blow out into the room and parallel with the cover. In this modification the air would not be recirculated.

The foregoing relates to preferred exemplary embodiments of the invention, it being understood that other variants and embodiments thereof are possible within the spirit and scope of the invention, the latter being defined by the appended claims.

What it claimed and desired to be secured by Letters Patent of the United States is:

1. A clean air facility comprising an assemblage of horizontal and vertical pipes interconnected together at their ends to form a supporting structure, said supporting structure including first (18, 42), second (20, 44), third (22, 46) and fourth (24, 48) spaced parallel, elongated, vertical extending supporting pipe means of equal length, each supporting pipe means having an upper end with the upper ends in a same horizontal plane, each supporting pipe means having a lower end with the lower ends in a same horizontal plane, a first parallel horizontal supporting means including a first supporting pipe (14) between said first and second elongated vertical supporting pipe means and a second supporting pipe (16), between said third and fourth elongated supporting pipe means, said first parallel horizontal supporting means adjustably secured near the lower end of said elongated vertical supporting means, a second horizontal supporting means adjustably supported by said elongated vertical support pipe means upwardly from said first supporting means, said second horizontal supporting means including a first pipe means (26) between said first and second elongated vertical support pipe means, a second pipe means (28) between said third and fourth elongated vertical support means, a third horizontal support means (30) between said first and third elongated vertical support pipe means and a fourth supporting pipe means (32) between said second and fourth elongated vertical supporting means, each supporting pipe of said second support means being in a same horizontal plane;

a third horizontal supporting means fixedly secured to the upper ends and between each of said first, second, third, and fourth elongated vertical supporting pipe means, a first pair (21, 23) of spaced short, vertically extending supporting pipe means adjustably secured between said first parallel supporting pipe of said first horizontal supporting means and said first pipe means of said second horizontal supporting means, a second pair (27, 33) of spaced short vertically extending pipe means adjustably secured between said second supporting pipe means of said first parallel supporting means and said second horizontal support means of said second horizontal supporting means, said first and second pair of short vertical supporting pipe means being equally spaced from a center line between said first and second elongated vertically extending supporting pipe means and between said third and fourth elongated vertically extending supporting pipe means, a fourth horizontal supporting pipe means, said fourth horizontal supporting pipe means including a pair of supporting pipe means (34, 36) secured between said first and second pair of short vertically extending support means with one each supporting pipe of said pair secured on opposite sides of said center line, at least one blower (38, 40) mounted on said fourth horizontal supporting pipe means;

said at least one blower having an inlet and an outlet, said inlet formed by an upper end of said blower;

a HEPA filter mounted on a fifth horizontal supporting pipe means (31, 35) with the HEPA filter in a vertical position, said HEPA filter including a bottom side mounted on said fifth horizontal supporting pipe means on a level higher than said inlet end of said at least one blower and an upper side of said HEPA filter is supported by downwardly extending spaced short vertical pipe means (87) secured at their upper ends, said HEPA filter having a front side that forms an outlet and a back side that forms an inlet, said outlet and inlet extending from said bottom side to said upper side;

a closed hinge duct (84, 85) connected to said outlet of said at least one blower, said closed duct extending from said outlet of said at least one blower and connected to a closed air conducting cover (86) secured along a back side of said HEPA filter which directs air from said at least one blower along and through said inlet of said HEPA filter, a pan element (62) secured over said at least one blower, said pan element having at least one aperture (78, 80) that fits over said inlet to said at least one blower, a cover (64) for said pan, said cover including slots (65) along a front edge of said cover through which air is drawn by said at least one blower, to said inlet, said facility including a side panel, a top panel and a front panel, each of said panels being secured to said supporting structure so as to form an air tight chamber.

2. A clean air facility according to claim 1, in which each of said side panels, said back panel, said top panel and said front panel are all made of vinyl.

3. A clean air facility according to claim 1, which includes two blowers with an outlet duct connected to each said blower and to said closed air conducting cover secured along a backside of said HEPA filter.

4. A clean air facility according to claim 3, in which each of said blowers are secured to said spaced horizontal pipes of said fourth horizontal supporting pipe means by means of hook and loop fastener connections, and said pan is secured to said supporting structure and to each said blowers by a hook and loop fastener connection which adheres to each other when pressed together.

5. A clean air facility as set forth in claim 4, in which each of said side panel, said back panel, said top covering and said front panel are secured to said supporting structure by a hook and loop fastener connection, which adheres to each other when pressed together.

* * * * *